United States Patent [19]
Nishiyama et al.

[11] Patent Number: 4,878,192

[45] Date of Patent: Oct. 31, 1989

[54] ARITHMETIC PROCESSOR AND DIVIDER USING REDUNDANT SIGNED DIGIT ARITHMETIC

[75] Inventors: Tamotsu Nishiyama; Shigeo Kuninobu, both of Osaka, Japan

[73] Assignee: Matsushita Electric Industrial Co. Ltd., Osaka, Japan

[21] Appl. No.: 70,565

[22] Filed: Jul. 7, 1987

Related U.S. Application Data

[63] Continuation-in-part of Ser. No. 66,817, Jun. 25, 1987.

[30] Foreign Application Priority Data

Jul. 11, 1986 [JP] Japan .................................. 61-164090
Jul. 11, 1986 [JP] Japan .................................. 61-164091

[51] Int. Cl.$^4$ ............................................. G06F 7/49
[52] U.S. Cl. .................................... 364/768; 364/761
[58] Field of Search .......................... 364/761, 754, 768

[56] References Cited

PUBLICATIONS

Avizienis, "Binary-Compatible Signed-Digit Arithmetic", *Proceedings-Fall Joint Computer Conference*, 1964, pp. 663-672.
Tung, "Division Algorithm for Signed-Digit Arithmetic", *IEEE Trans. on Computers*, Sep. 1968, pp. 887-889.
Atkins, "Design of the Arithmetic Units of ILLIAC III: Use of Redundancy & Higher Radix Methods", *IEEE Trans. on Computers*, vol. C-19, No. 8, Aug. 1977, pp. 720-733.
A VLSI-Oriented High-Speed Divider Using Redundant Binary Representation, Takagi et al., IECE Japan, vol. 167.D, #4, pp. 450-457, 4/84.
A VLSI-Oriented High-Speed Multiplier Using Redundant Binary Adder Tree, Takagi et al., IECE Japan, vol. J66.d, pp. 683-690, 6/84.
A New Class of Digital Division Methods, James Robertson, IRE Transactions on Electronic Computers, pp. 218-222, 9/58.
Signed-Digit Number Representations for Fast Parallel Arithmetic, Avizienis, IRE Transactions on Electronic Computers, pp. 389-400, 9/61.
A Class of Binary Divisions Yielding Minimally Represented Quotients, Metze, IRE Transactions of Electronic Computers, pp. 761-764, 12/62.

(List continued on next page.)

*Primary Examiner*—David H. Malzahn
*Attorney, Agent, or Firm*—Amster, Rothstein & Ebenstein

[57] ABSTRACT

An arithmetic processor and an addition/subtraction circuit therefor are disclosed. The arithmetic processor comprises a plurality of the addition/subtraction units arranged in parallel, each unit being capable of carrying out addition (or subtraction) with respect to respective digits of two operands. An addition/subtraction unit comprises a first circuit and a second circuit coupled to receive binary signals each representing a respective digit of the operands. At least a first of the two binary signals is a 2-bit signal representing a signed digit expression, one bit of which ("the sign bit") represents the sign of one of the digits of the operands and the other bit of which ("the magnitude bit") represents the magnitude of that one digit of the operands. The first circuit provides a binary signal representing an intermediate carry (or borrow) and the second circuit provides a binary signal representing an intermediate sum (or difference) from the two binary signals representing the digits of the operands. The addition/subtraction unit further comprises a third circuit which is coupled to receive the intermediate sum (or difference) binary signal output from the second circuit and a binary signal representing an intermediate carry (or borrow) from a next-lower-order digit, and outputs a 2-bit binary signal representing an addend (or subtrahend). That 2-bit signal output by the third circuit represents a signed digit expression, one bit, i.e., the sign bit, represents the sign of the addend (or subtrahend) and the other bit, i.e., the magnitude bit, represents the magnitude of the addend (or subtrahend).

23 Claims, 5 Drawing Sheets

OTHER PUBLICATIONS

Design of the Arithmetic Units of ILLIAC III, Redundancy & Higher Radix Methods, Atkins, IEEE Transacts. on Computers, vol. C-19, pp. 720-732, 8/70.

Multiple OPerand Addition and Multiplication, Shanker Singh et al., IEEE Transactions on Computers, vol. C-22, No. 2, pp. 113-120, 2/73.

Concise Papers, Lyon, IEEE Transactions on Communications, pp. 418-425, 4/76.

Real-Time Processing Gains Ground with Fast Digital Multiplier, Waser et al., Electronics, pp. 93-99, 9/77.

High Speed Multiplier Using A Redundant Binary Adder Tree, Harata et al., IEEE International Conference on Computer Design, pp. 165-170, 1984.

High Speed VLSI Multiplication Algorithm with a Redundant Binary Addition Tree, Takagi et al., IEEE Transactions on Computers, vol. C-34, No. 9, pp. 1789-1795, 9/85.

Design of High Speed MOS Multiplier and Divider Using Redundant Binary Representation, Kuninobu et al., Proceedings 8th Symposium on Computer Arithmetic, pp. 80-86, 5/87.

ARITHMETIC PROCESSOR AND DIVIDER USING REDUNDANT SIGNED DIGIT ARITHMETIC

RELATED APPLICATION

This is a continuation-in-part of application Ser. No. 066,817 filed June 25, 1987 entitled "Arithmetic Processor Using Redundant Signal Digit Arithmetic", the disclosure of which is incorporated herein by reference.

BACKGROUND OF THE INVENTION

The present invention relates to an arithmetic processor capable of high-speed arithmetic operation and to an arithmetic addition/subtraction unit therefor, and, more particularly, to a high-speed arithmetic processor which has a cellular array structure including a number of such arithmetic addition/subtraction units which may be compactly fabricated on an LSI chip.

A high speed adder, multiplier and divider are respectively discussed in *Trans. of IECE Japan*, No.2, 1986, pp.187; *Trans. of IECE Japan*, Vol.J66-D, No.6, 1983, pp.683 to 690; and *Trans. of IECE Japan*, Vol.J67-D, No.4, 1984, pp.450 to 457. Those arithmetic units execute multiplication or division by means of combinational circuitry using the redundant binary expression (a kind of signed digit expression) in which each digit is represented by a set of elements $\{-1, 0, 1\}$.

In particular, a prior art divider of the shift, subtract restore type uses the redundant binary expression and is implemented by ECL (emitter-coupled-logic) circuitry. While that prior art divider has faster arithmetic processing speeds than other types of conventional dividers, no consideration has been given to factors which are important for fabricating such a divider commercially, such as a reduction in the number and size of transistors and use of other types of circuitry, e.g., CMOS.

Dividers in wide use today are sequential circuits each having a subtracter (adder) and a shifter. However, it is well known that, as the number of digits of the operands increases, an exceedingly long time is required for those dividers to perform arithmetic operations. On the other hand, large-size computers having high-speed multipliers often employ multiplication-type division in which division is performed by repetition of multiplication. However, implementation of such multiplication-type division by combinational circuitry requires large numbers of hardware elements, and is therefore impractical.

With respect specifically to a high-speed arithmetic unit employing signed digit numbers for arithmetic operation, a method has been proposed in which an arithmetic operation such as multiplication or division is carried out by combinational circuitry utilizing an ECL logic element that enables NOR and OR operations to be simultaneously performed. However, exhaustive consideration has heretofore not been given to problems which must be solved to put that proposed high-speed arithmetic unit into practical use, such as reducing the number of transistors required and implementation using other types of circuitry, and, therefore, the following problems are associated with that proposed high-speed arithmetic unit:

(1) As the number of digits of the operands increases, the number of transistors required increases, which makes it difficult to fabricate an arithmetic unit capable of handling a large number of digits on a single LSI chip.

(2) When the arithmetic unit is implemented using, for example, a MOS circuit which cannot perform NOR and OR operations at the same time, the OR circuit is implemented by elements formed in two stages, that is, a NOR gate and an inverter, and the number of stages or gates required in the arithmetic circuit increases correspondingly, resulting in an increase in operation time.

OBJECTS AND SUMMARY OF THE INVENTION

It is an object of the present invention to provide a high-speed arithmetic processor which can readily be fabricated compactly on an LSI chip.

It is another object of the present invention to provide such a high-speed arithmetic processor utilizing combinational circuitry in which signed digit numbers are employed for internal addition and subtraction.

It is another object of the present invention to provide a high-speed arithmetic processor which adopts an array structure and in which the number of required elements (transistors) is substantially reduced (e.g., by half) as compared to prior art high-speed arithmetic processors.

It is another object of the present invention to provide such a high-speed arithmetic processor which minimizes the number of digits which need carry propagation for internal addition and subtraction (e.g., one digit at most).

It is another object of the present invention to provide a high-speed arithmetic processor which is of simplified circuit configuration.

It is another object of the present invention to provide an arithmetic addition/subtraction circuit or unit for use in a high-speed arithmetic processor.

It is another object of the present invention to provide a cellular high-speed arithmetic processor which utilizes a number of such arithmetic units arranged in an array.

In achieving the above and other objects, an arithmetic processor and an addition/subtraction unit therefor are provided, the arithmetic processor comprising a plurality of the addition/subtraction units arranged in parallel, each unit being capable of carrying out addition (or subtraction) with respect to respective digits of two operands. An addition/subtraction unit comprises a first circuit and a second circuit coupled to receive binary signals each representing a respective digit of the operands. At least a first of the two binary signals is a 2-bit signal representing a signed digit expression, one bit of which ("the sign bit") represents the sign of one of the digits of the operands and the other bit of which ("the magnitude bit") represents the magnitude of that one digit of the operands. The first circuit provides a bindary signal representing an intermediate carry (or borrow) and the second circuit provides a binary signal representing an intermediate sum (or difference) from the two binary signals representing the digits of the operands. The addition/subtraction unit further comprises a third circuit which is coupled to receive the intermediate sum (or difference) binary signal output from the second circuit and a binary signal representing an intermediate carry (or borrow) from a next-lower-order digit, and outputs a 2-bit binary signal representing an addend (or subtrahend). That 2-bit signal output by the third circuit represents a signed digit expression, one bit, i.e., the sign bit, of which represents the sign of the addend (or subtrahend) and the other bit, i.e., the magnitude bit, of which represents the magnitude of the addend (or subtrahend).

The arithmetic processor also includes first means for receiving the first binary signal and a 1-bit control signal, and for providing an output signal which is either the same as the first binary signal or is inverted in sign with respect to the first binary signal depending on the 1-bit control signal. In a specific embodiment, the first means comprises an exclusive logical OR circuit having inputs coupled to receive the sign bit of the 2-bit first binary signal, and the 1-bit control signal, and having an output on which one bit (the sign bit) of the first means output signal is provided. The first means output signal is a 2-bit signal, the second bit of which is the magnitude bit of the first binary signal.

The arithmetic processor includes second means for receiving a second of the two binary signals representing a respective digit of the operands and a 1-bit control signal, and for selectively converting the second binary signal to an output signal which is a logical "0" in response to the 1-bit control signal. In a specific embodiment, the second means comprises a logical NOR circuit having inputs which receive the second binary signal and the control signal, and an output on which the second means output signal is provided as a logical "0" when the control signal is a logical "1".

According to a preferred embodiment, the second circuit comprises an exclusive logical OR circuit having inputs coupled to receive one bit of each of the two binary signals representing respective digits of the operands. One input of the OR circuit receives, as an augend (or minuend), the magnitude bit of the 2-bit first binary signal which represents one of the respective digits of the operands, and the other input receives, as an addend (or subtrahend), that bit of the second binary signal which represents the magnitude of the other of the respective digits of the operands. The logical OR circuit has an output on which the intermediate sum (or difference) binary signal is provided as a 1-bit signal. The third circuit includes an exclusive logical NOR circuit having inputs coupled to receive the 1-bit intermediate sum (or difference) signal from the second circuit and, as a 1-bit signal, the binary signal representing the intermediate carry (or borrow) from a next-lower-order digit, the exclusive logical NOR circuit having an output on which the magnitude bit of the 2-bit binary signal representing the magnitude of the addend is provided.

In a preferred embodiment, the first circuit includes a switch circuit coupled to receive the output signal of the first means, the magnitude bit of the 2-bit first binary signal and the output signal of the second means. The switch circuit has an output on which the intermediate carry (or borrow) signal is provided as either the output of the first means or the output of the second means depending upon that one magnitude bit of the 2-bit first binary signal.

The arithmetic processor described above performs arithmetic operations utilizing internal addition and subtraction with respect to the respective digits of the operands, and comprises a quotient determining means and a partial remainder determining means corresponding to the quotient determining means. The partial remainder determining means includes a first step arithmetic circuit including the first circuit and the second circuit, and a second step arithmetic circuit including the third circuit. The first and second step arithmetic circuits carry out the required arithmetic operations using addition (or subtraction) only.

In a specific embodiment, the quotient determining means outputs a 1-bit binary control signal to the partial remainder determining means in response to which the first step arithmetic circuit performs addition (or subtraction) or digit shifting. The quotient determining means is coupled to receive a 3-bit binary signal representing the three most significant digits of a partial remainder signal output by a partial remainder determining means of a preceding stage and a 1-bit binary signal output from a next-higher-order digit of the quotient determined by a quotient determining means of a receding stage, and provides a quotient in response thereto.

The addition/subtraction unit is obtained mathematically as follows. Addition and subtraction used to carry out internal arithmetic operations including multiplication, division, addition and subtraction, may be described using the signed digit expression (hereinafter referred to as "SD expression") in which each digit is expressed by one of the following elements: "0", a positive integer; and a negative integer corresponding to the positive integer. In the SD expression, each digit is expressed by any of the following elements:

$$\{-1, 0, 1\}; \{-2, -1, 0, 1, 2\}; \{-N, \ldots, -1, 0, 1, \ldots, N\},$$

etc., whereby redundancy is provided so that one number can be expressed in a plurality of different ways. An intermediate carry (or borrow) and an intermediate sum (or difference) of a digit, even of a lower order digit, may be determined so that the final sum (or difference) of the intermediate sum (or difference) of that digit and the carry (or borrow) from the next lower order digit may be obtained in a single digit. This makes it possible to prevent borrow (or carry) propagation in subtraction (or addition) and thus enables parallel subtraction (or addition) to be executed by the combinational circuitry within a predetermined time irrespective of the number of digits of the operands. For example, in the SD expression in which each digit is expressed in an element set $\{-1, 0, 1\}$, it is possible to prevent carry (or borrow) propagation in addition (or subtraction) from occurring at more than one digit. This is described in, for example, *Trans of IECE Japan*, Vol.J67-D, No.4, 1984, pp.450 to 457 and in *Trans of IECE Japan*, Vol.J66-D, No.6, 1983, pp.683 to 690.

For arithmetic operations such as multiplication, division, addition and subtraction, it is possible to use redundant addition (or subtraction) of a number expressed in an SD expression (i.e., a redundant binary number) and a number expressed in an SD expression having non-negative digits (i.e., a binary number). Addition of an augend of a redundant binary number X and an addend of a binary number, to provide an added number is described below in connection with a shift-subtract-restore division method.

The shift-subtract/restore division method is generally represented by the following recurrence formula:

$$R^{(j+1)} = r \times R^{(j)} - q_j \times D,$$

where
j = exponent of the recurrence formula,
r = radix,
D = divisor,
$q_j$ = j-th quotient digit from a decimal point, $r \times R^{(j)}$ = partial dividend before determination of $q_j$, and $R^{(j+1)}$ = partial remainder after determination of $q_j$.

Thus, the divider can be realized in the form of combinational circuitry by providing, for each exponent j of the recurrence formula, a quotient-determining circuit for determining the quotient $q_j$ and a partial remainder determining circuit which subtracts or does not subtract D from $r \times R^{(j)}$ in accordance with the value of $q_j$. In internal arithmetic operations, moreover, an internal operand may be expressed using the SD expression.

A high-speed divider may be implemented using the SD expression for the arithmetic operations described above. For example, if an SD expression of radix 2 and a signless binary number X consisting of one bit for the integer part and n bits for the decimal part is expressed as follows:

$$X = [x_0.x_1 \ldots x_n]_{SD2},$$

then X may be expressed as follows:

$$\sum_{i=0}^{n} x_i(2^{-i}),$$

where each digit $x_i$ is expressed as an element in the set $\{-1, 0, 1\}$.

If the divisor D and each partial remainder $R^{(j)}$ in the above-described recurrence formula are expressed in an SD expression of radix 2, it is necessary to add or subtract D in accordance with the value of $q_j$ in such a manner that, when $q_j = -1$, $R^{(j)}$ is shifted leftward by one digit and D is added; when $q_j = 0$, $R^{(j)}$ is shifted leftward by one digit; and when $q_j = 1$, $R^{(j)}$ is shifted leftward by one digit and D is subtracted.

In particular, according to the present invention, the partial remainder $R^{(j+1)}$ can be determined after determination of the j-th decimal digit $q^j$, i.e., the j-th digit from a decimal point, by addition using only the SD expression, in accordance with the value of $q_j$ by a means (e.g., the first means) for inverting the sign of an internal operand in the SD expression and a means (e.g., the second means) for assigning "0" to an internal operand, as follows:

$$R^{(j+1)} = P^{(j)}(P^{(j)}(r \times R^{(j)}) + D^{(j)}).$$

$P^{(j)}$ in the above relationship is a function for sign inversion, and $D^{(j)}$ and $P^{(j)}$ may be set in a variety of ways, two of which are as follows:

Case (I)
$$D^{(j)} = \begin{cases} \overline{D} \text{ (when } q_j = -1) \\ 0 \text{ (when } q_j = 0) \\ D \text{ (when } q_j = 1) \end{cases}$$

$P^{(j)}(X) = X$ (i.e., $P^{(j)}$ is an identity mapping);

Case (II)
$$D^{(j)} = \begin{cases} \overline{D} \text{ (when } q_j = -1) \\ 0 \text{ (when } q_j = 0) \\ D \text{ (when } q_j = 1) \end{cases}$$

-continued
$$P^{(j)}(X) = \begin{cases} \overline{X} \text{ (when } q_j = -1) \\ X \text{ (when } q_j = 0) \\ X \text{ (when } q_j = 1) \end{cases}$$

$\overline{D}$ and $\overline{X}$ are numbers obtained by inverting the signs of D and X, respectively, in the SD expression. The sign inversion in the SD expression is effected in such a manner that, if the digit is 1, the digit is changed to $-1$; if the digit is $-1$, it is changed to 1; and if the digit is 0, it is left unchanged. However, when D is expressed in the SD expression in which each digit is non-negative as in the case of $\overline{D}$, the sign inversion can be effected by the 2's complement binary representation.

The recurrence formula for determining the partial remainder $R^{(j+1)}$ can be transformed into the following equation if $A^j = p^{(j-1)}(R^{(j)})$ is introduced:

$$A^{(j+1)} = T^{(j)}(2 \times A^{(j)}) + D^{(j)}.$$

Here $T^{(j)}$ is a function defined by the following equation for the SD expression number X:

$$T^{(j)}(X) = p^{(j)}(P^{(j-1)}(X)).$$

In the above equation for determining the value $A^{(j+1)}$, each digit is always non-negative for Case (II), and most digits except the most significant digit can be made non-negative in Case (I) by expressing $\overline{D}$ in a 2's complement binary number. To determine the value $A^{(j+1)}$, it is possible to use an addition means which have an augend expressed in an SD expression number (i.e., a redundant binary expression number) and an addend of digits expressed in a non-negative expression number (i.e., a binary expression number).

For an addition operation or algorithm having only one carry propagation digit, an intermediate sum is determined in accordance with Table 1, and an intermediate carry is determined in accordance with Table 2:

TABLE 1

| | Augend (Redundant Binary) | | |
|---|---|---|---|
| | $-1$ | 0 | 1 |
| Addend (Binary) 0 | $-1$ | 0 | $-1$ |
| 1 | 0 | $-1$ | 0 |

TABLE 2

| | Augend (Redundant Binary) | | |
|---|---|---|---|
| | $-1$ | 0 | 1 |
| Addend (Binary) 0 | 0 | 0 | 1 |
| 1 | 0 | 1 | 1 |

In the present invention, by expressing the redundant binary number $a_{i+1}{}^j$ as a 2-bit binary signal in which one bit represents the sign thereof and one bit represents the magnitude (i.e., absolute value) thereof, an intermediate sum determining means (e.g., the second circuit) for each digit may be implemented by a circuit performing the exclusive logic sum $B.\overline{C} + \overline{B}.C$ from a 1-bit binary signal B representing the magnitude of the redundant binary member $T^{(j)}(a_{i+1}{}^j)$ and a 1-bit binary signal C representing a binary number $d_i{}^j$. Intermediate carry means (e.g., the first circuit) for each digit may be implemented by a circuit performing the logic operation $A.B + C.\overline{B}$ from a 1-bit signal A representing the sign of the redundant binary number $T^{(j)}(a_{i+l'})$, a 1-bit binary signal C representing the binary number $d_i{}^j$ and a 1-bit binary signal B representing the magnitude of the redundant binary number $T^{(j)}(a_{i+l'})$, and providing either the signal A or C depending upon the value of the signal B. If the intermediate carry from a lower-order-digit is denoted by K, the 1-bit signal expressing the magnitude of the redundant binary number $a_{i-}{}^{(j+1)}$ can be determined by a means (e.g., the third circuit) performing the exclusive logic sum:

$$K \cdot (B \cdot C + \overline{B} \cdot \overline{C}) + \overline{K} \cdot (\overline{B} \cdot C + B \cdot \overline{C}),$$

and the 1-bit signal representing the sign of the number $a_i{}^{(j+1)}$ can be determined by a means for performing the operation:

$$\overline{K} + (\overline{B} \cdot C + B \cdot \overline{C}).$$

This makes it possible to reduce the number of transistors required in each of the aforementioned addition/subtraction units (or cells) and to eliminate any unnecessary propagation delays. As a result, high speed division can easily be implemented in LSI by constructing a divider in a regular array structure of the addition/subtraction units (or cells).

BRIEF DESCRIPTION OF THE DRAWINGS

FIG. 6 is a circuit diagram showing a CMOS circuit which defines the quotient-determining circuit shown in FIG. 1.

DESCRIPTION OF THE PREFERRED EMBODIMENTS

Figure 1:
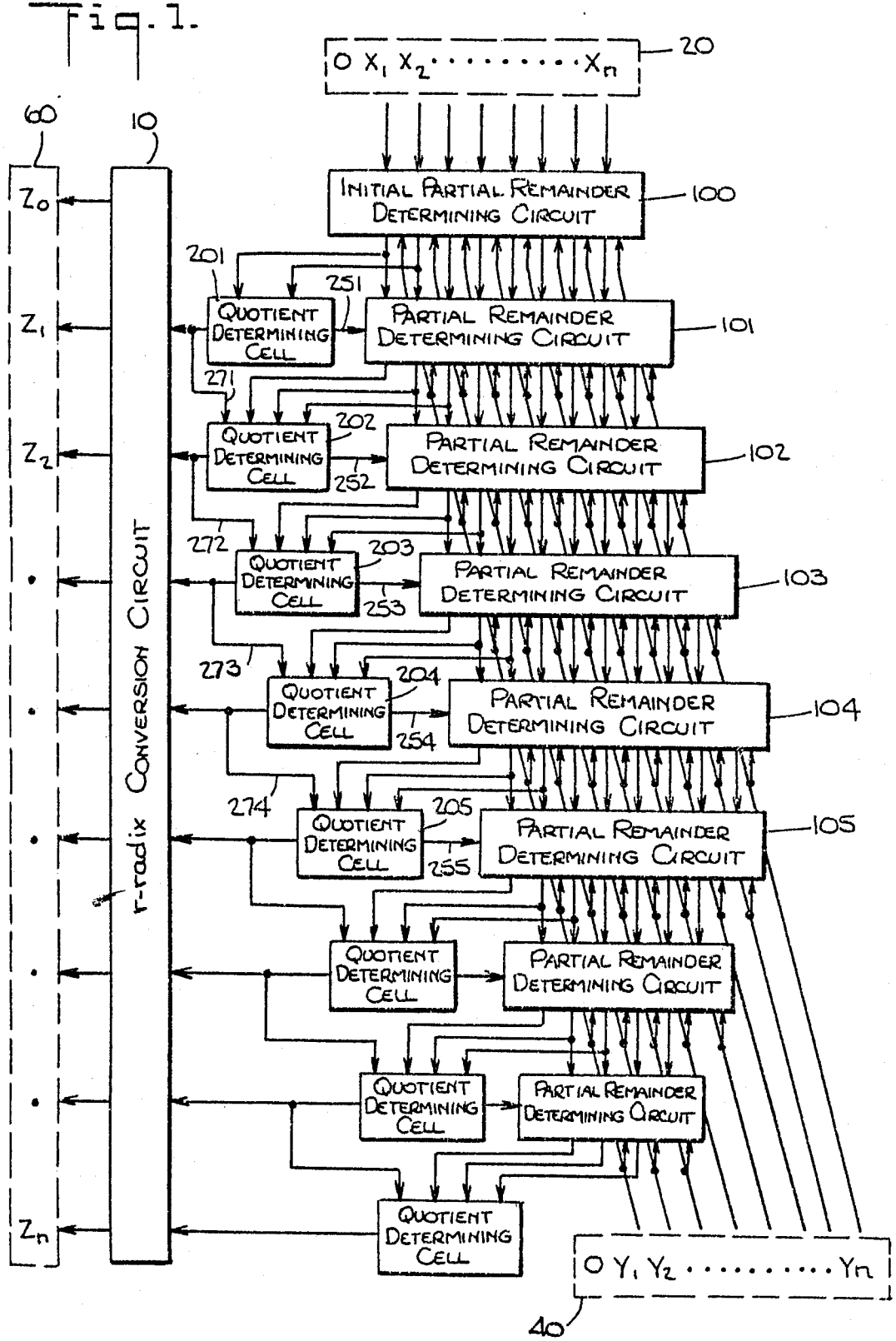
FIG. 1 is a block diagram of a divider in accordance with one embodiment of the invention.

FIG. 1 is a block diagram showing one embodiment of the present invention which is described below in connection with a divider for n-digit and r-radix signless decimals, specifically for the case where n=8 and r=2. Referring to FIG. 1, a dividend within the broken-line block 20 (hereinafter referred to as "dividend 20") is input to an initial partial remainder determining circuit 100 in the form of signals respectively corresponding to values $x_1, x_2, \ldots, x_n$ for the 1st, 2nd, $\ldots$, n-th digits to the right of the decimal point. Similarly, a divisor within the broken-line box 40 (hereinafter referred to as "divisor 40") is input to the initial partial remainder determining circuit 100 and to the partial remainder determining circuits 101, 102, 103, 104, 105, $\ldots$ in the form of signals representing values $y_1, y_2, \ldots, y_n$ for the 1st, 2nd, $\ldots$, n-th digits to the right of the decimal point. A quotient within broken-line block 60 (hereinafter referred to as "quotient 60") is output from an r-radix conversion circuit 10 in the form of an r-radix number consisting of the 1st integral digit $z_0$ and the 1st decimal digit $z_1$, the second decimal digit $z_2, \ldots,$ the n-th decimal digit $z_n$. The initial partial remainder determining circuit 100 receives dividend 20, $[0.x_1x_2 \ldots x_n]_r$, and divisor 40, $[0.y_1y_2 \ldots y_n]_r$, as its inputs, and outputs a partial remainder after the 1st integral digit of the quotient, or a value obtained by inverting the sign of this partial remainder, is determined. In particular, if the dividend and the divisor are normalized, then $x_1 = y_1 = 1$, is readily obtained. The following description will be made with respect to division in which the dividend and the divisor are normalized.

Each of the partial remainder determining circuits 101, 102, 103, 104, 105 $\ldots$ receives the output of a respective partial remainder determining circuit (or the initial partial remainder determining circuit 100) which is immediately above it as viewed in FIG. 1, together with the divisor 40 and a respective control signal 251, 252, 253, 254, 255 $\ldots$ which is output from a respective quotient-determining cell 201, 202, 203, 204, 205 $\ldots$ disposed adjacent to a respective partial remainder determining circuit 101, 102, 103, 104, 105 $\ldots$, and outputs a partial remainder or a value obtained by inverting the sign of the partial remainder, which is then input to a subsequent (i.e., lower) partial remainder determining circuit.

Each of the quotient-determining cells 201, 202, 203, 204, 205 $\ldots$ receives at its inputs the three most significant digits of a partial remainder, or a value obtained by inverting the sign of this partial remainder, output from the partial remainder determining circuit immediately above the respective quotient-determining cell (e.g., from the (j−1)th partial remainder determining circuit), together with the value of the j−1th decimal digit of the quotient in the SD expression which has been determined in the quotient-determining cell immediately above (i.e., the (j−1)th quotient-determining cell), and outputs the value for the j-th decimal digit of the quotient, together with the respective control signal 251, 252, 253, 254, 255 $\ldots$, which is supplied to the partial remainder determining circuit in the same stage (i.e., the j-th stage).

The r-radix conversion circuit 10 receives at its inputs the digits of a quotient in the SD expression which have been determined in quotient-determining cells 201, 202, 203, 204, 205 $\ldots$, respectively, and outputs a quotient 60, $[z_0.z_1z_2 \ldots z_n]_r$, which is an ordinary r-radix number in which each digit is non-negative.

The division method employing the embodiment of FIG. 1 will briefly be explained for the case of inversion of signs of the SD expression for the augend. $A^{(1)}$ is determined in initial partial remainder determining circuit 100 as follows:

$$A^{(1)} = [0.\bar{x}_1\bar{x}_2 \ldots \bar{x}_n]_{SD2} + [0.y_1y_2 \ldots y_n]_{SD2}.$$

It should be noted that $\bar{x}_i$ is a number obtained by inverting the sign of $x_1$ for $i = 1, 2, \ldots, n$. Since $y_i$ is non-negative at all times for $i = 1, 2, \ldots, n$, initial partial remainder determining circuit 100 can be implemented by using an addition circuit which handles a conventional binary number and a redundant binary number. Since each of the digits $X_1, X_2, \ldots, X_n$ and $y_1, y_2, \ldots, y_n$ is non-negative, circuit 100 can also be implemented by a subtraction circuit.

Next, a description will be made of the determination of the j-th decimal digit $q_j$ and the partial remainder $A^{(j+1)}$ in the case where the partial remainder $A^{(j)} = [a_0{}^j.a_1{}^ja_2{}^j \ldots a_n{}^j]_{SD2}$ and the (j−1)th decimal digit of $q_{j-1}$ of the quotient have already been determined.

The j-th decimal $q_j$ of the quotient is determined in accordance with the value of the most significant three digits $[a_0^j.a_1^j a_2^j]_{SD2}$ of the partial remainder $A^{(j)}$ and the $j-1$th decimal digit $q_{j-1}$ of the quotient in the j-th cell of the quotient-determining cells 201, 202, 203, 204, 205 . . . . More specifically, determination is made as follows: if the value of the most significant three digits of $A^{(j)}$ is positive, $q_j = \text{sign}(-q_{j-1})$; if it is 0, $q_j = 0$; and if it is negative, $q_j = -\text{sign}(q_{j-1})$. Sign $(-q_{j-1})$ is defined as follows:

$$\text{sign}(-q_{j-1}) = \begin{cases} 1 & \text{(when } q_{j-1} < 0) \\ 1 & \text{(when } q_{j-1} = 0) \\ -1 & \text{(when } q_{j-1} > 0) \end{cases}$$

In the j-th circuit the partial remainder determining circuits 101, 102, 103, 104, 105 . . . , $$A^{(j+1)} = T^{(j)}(2 \times A^{(j)}) + D^{(j)}$$

is calculated to determine the partial remainder $A^{(j+1)}$. It should be noted that the first term of the above equation for $A^{(j+1)}$ is as follows:

(i) when sign $(-q_{j-1}) \times \text{sign}(-q_j) = 1$, $$T^{(j)}(2 \times A^{(j)}) = [a_0^j.a_1^j.a_2^j \ldots a_n^j/0]_{SD2};$$

(ii) when $\text{sign}(-q_{j-1}) \times \text{sign}(-q_j) = -1$, $$T^{(j)}(2 \times A^{(j)}) = [b_0^j.b_1^j.b_2^j \ldots b_n^j/0]_{SD2};$$

where, $b_i^j = -a_i^j$ for $i = 0, \ldots, n$. and the second term is as follows:

(i) when $q_j \neq 0$, $$D^{(j)} = [0.y_1 y_2 \ldots y_n]_{SD2};$$

(ii) when $q_j = 0$, $$D^{(j)} = [0.00 \ldots 0]_{SD2}.$$

$D^{(j)}$ is a binary number in both cases. Thus, each digit is a non-negative redundant binary number. Accordingly, each of the partial remainder determining circuits 101, 102, 103, 104, 105 . . . can be implemented using an addition circuit which handles redundant binary number and a conventional binary number each digit of which is non-negative, a circuit which inverts a redundant binary number and a circuit which determines an addend. In that case, each of the control signals 251, 252, 253, 254, 255 . . . which are delivered to the corresponding partial remainder determining circuits is formed in accordance with the magnitude of the corresponding quotient digit $q_j$ and as to whether or not $-q_j$ and $-q_{j-1}$ are different from each other in terms of sign.

Finally, when the individual digits $q_j$ of the quotient are determined for $j = 1$ to n, as above, so that the quotient $Q = [q_0.q_1 q_2 \ldots q_n]_{SD2}$ is determined, the quotient Q expressed in the SD expression by converter 10 is converted into the normal radix-r (i.e., binary) quotient expression 60, i.e., $Z = [z_0.z_1 z_2 \ldots z_n]_r$. The converter 10 executes a normal subtraction $(Q^+ - Q^-)$ of a non-signed binary number $Q^-$, which is obtained by setting only the $-1$ digits of the quotient Q in the redundant binary expression to 1, from a non-signed binary number $Q^+$, which is obtained by setting only the 1 digits of the quotient Q to 1, and can be implemented by ripple-carry addition circuitry or carry look ahead addition circuitry.

The description above was made for performing the division method using each of the blocks of the divider embodiment shown in FIG. 1. However, input signal lines 271, 272, 273, 274 in FIG. 1 for inputting signals to the quotient-determining cells 202, 203, 204, 205, 206 . . . from respective higher-order quotient-determining cells may be omitted.

Figure 2:
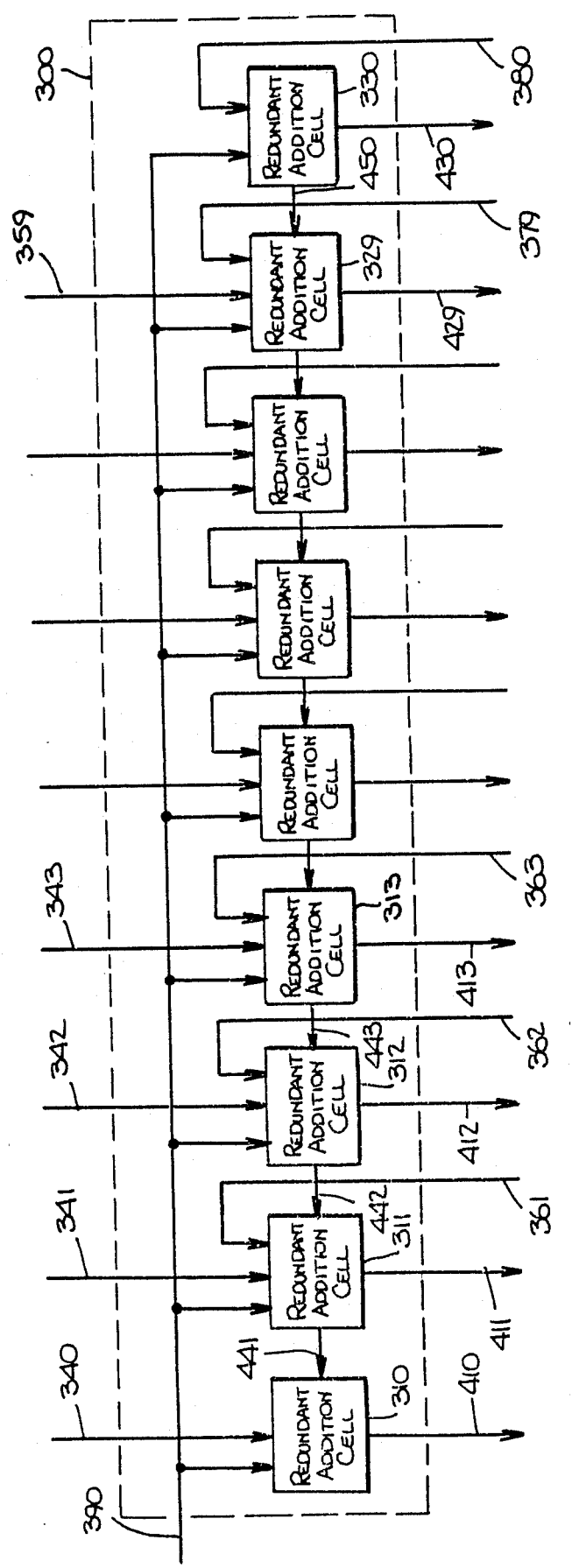
FIG. 2 is a block diagram of one embodiment of each of the partial remainder determining circuits of the divider of FIG. 1.

FIG. 2 is a block diagram showing an embodiment of the partial remainder determining circuits 101, 102, 103, 104, 105 . . . of FIG. 1. A partial remainder determining circuit 300 is defined by an array of n+1 redundant addition cells 310, 311, 312, 313 . . . 329, 330. Assuming that partial remainder determining circuit 300 is the j-th partial remainder determining circuit in the embodiment shown in FIG. 1, inputs 340, 341, 342, 340, 341, 342, 343, . . . 359 corresponding to augends respectively represent values for digits $a_1^j, a_2^j, \ldots, a_n^j$ (i.e., the (j−1)th stage). Inputs 361, 362, 363, . . . , 380 corresponding to augends respectively represent digits $y_1, y_2, \ldots, y_n$ of the divisor. Control signal 390 is one of the control signals 251, 252 . . . shown in FIG. 1 and is determined in accordance with the previously determined digit $q_j$ or $q_{j-1}$ of the quotient in the quotient-determining cell in the same stage (i.e., the j-th stage). Inputs 441, 442, 443, . . . , 450 which are supplied from lower-order redundant addition cells to higher-order redundant addition cells represent intermediate carries from the lower-order digits. Outputs 410, 411, 412, . . . , 430 of redundant addition cells 310, 311, 312, . . . , 330 respectively represent the values of digits $a_0^{j+1}, a_1^{j+1}, a_2^{j+1}, \ldots, a_n^{j+1}$ of the partial remainder. It should be noted that, when $r = 2$, that is, when the binary expression is employed, the 1st decimal digit of the divisor is fixed as $y_1 = 1$, and therefore input 361 may be omitted. Moreover, the carry 450 from the final digit may also be omitted.

Redundant addition cells 310, 311, 312, 313, . . . , 329, 330 determine the 1st integral digit, the 1st decimal digit, the 2nd decimal digit, . . . , the n-th decimal digit, respectively, of the partial remainder $A^{(j+1)}$. Of these redundant addition cells, cells 312, 313, . . . , 329 for the 2nd decimal digit to the (n−1)th decimal digit may be constituted by basic cells for the purpose of reducing the number of elements required, and cells 310 and 311 for the most two significant digits and cell 330 for the least significant digit (i.e., the n-th decimal digit) may be constituted by higher order cells. Further, redundant addition cells 310 and 311 for the two most significant digits may be combined with the quotient-determining cell in the same stage (i.e., the j-th stage) to form a single cell, or redundant addition cell 330 for the least significant digit in the j-th stage and redundant addition cell 329 for the n−1th decimal digit in the j+1th stage may be combined together to form a single cell, for the purpose of reducing the number of elements. It is also possible to omit redundant addition cells for each $2 \times (n-j+1)$th decimal digit in the j-th partial remainder determining circuit for integers j in the range $n/2 < j \leq n-1$. FIG. 1 shows a first embodiment with such redundant addition cells omitted.

Basic cells in the redundant adding cells 310, 311, 312, . . . , and 330 are described below preceded by an example of binary coding of the concerned signals.

One digit $a_i^j$, or $q_j$ in a redundant binary expression is expressed by two bits $a_{i+}^j/a_{i-}^j$, or $q_{j+}/q_{j-}$, respectively, and −1, 0 and 1 binary-coded into 11, 10 and 01, respectively. At this time, the magnitude and sign of the j-th decimal digit $q_j$ of the quotient can be represented by $q_{j-}$ and $q_{j+}$, respectively. Further, the signal which indicates whether or not there is a difference in sign between the j-th decimal digit $q_j$ and (j−1)th decimal digit $q_{j-1}$ of the quotient is denoted $t_j$. More specifically, it is assumed that, if there is a difference in sign (i.e., when sign $(-q_j) \times \text{sign}(-q_{j-1}) = -1$), then $t_j = 0$, whereas, if there is no difference in sign (i.e., when sign $(-q_j) \times \text{sign}(-q_{j-1}) = 1$), then $t_j = 1$. Accordingly, $t_j$ can be determined in quotient determining cells 201, 202 . . . by the following equation:

$$t_j = a_{0+}{}^j \cdot (a_{0-}{}^j + a_{1+}{}^j) \cdot (a_{0-}{}^j + a_{1-}{}^j + a_{2+}{}^j) \cdot (a_{0-}{}^j + a_{1-}{}^j + a_{2-}{}^j + q_{j-1+}).$$

Further, $q_{j-}$ and $q_{j+}$ can be determined according to the following equations, respectively:

$$q_{j-} = a_{0-}^j + a_{1-}^j + a_{2-}^j -;$$

$$q_{j+} = (a_{0+}^j + (a_{0-}^j + a_{1+}^j) + (a_{0-}^j + a_{1-}^j + a_{2+}^j *) \oplus (g_{j-1+} + q_{j-});$$

where ".", "+" and "⊕" represent logical product (AND), logical sum (OR) and exclusive logical sum (EX-OR), respectively, and $$a_{i-}^j + a_{i+}^j \text{ and } q_{j-}$$

are operators representing logical negation $a_{i-}{}^j + a_{i+}{}^j$ and $q_{j-}$, respectively.

Further, the i-th decimal digit $d_i{}^j$ of the addend $D^{(j)}$, the intermediate sum $S_i{}^j$, and the intermediate carry $C_i{}^j$ can be determined according to the following equations, respectively:

$$d_i^j = y_i \cdot q_{j-};$$

$$S_i^j = a_{i+1-}^j \oplus d_i^j; \text{ and}$$

$$C_i^j = (a_{i+1+}^j \oplus t_j) \, a_{i+1-}^j + d_i^j \, a_{i+1-}^j.$$

The output $a_i{}^{j+1}$ of the redundant addition cell can be determined according to the following equations:

$$a_{i+}^{j+1} = S_i^j + C_{i+1}^j; \text{ and}$$

$$a_{i-}^{j+1} = S_i^j \oplus C_{i+1}^j.$$

Figure 3:
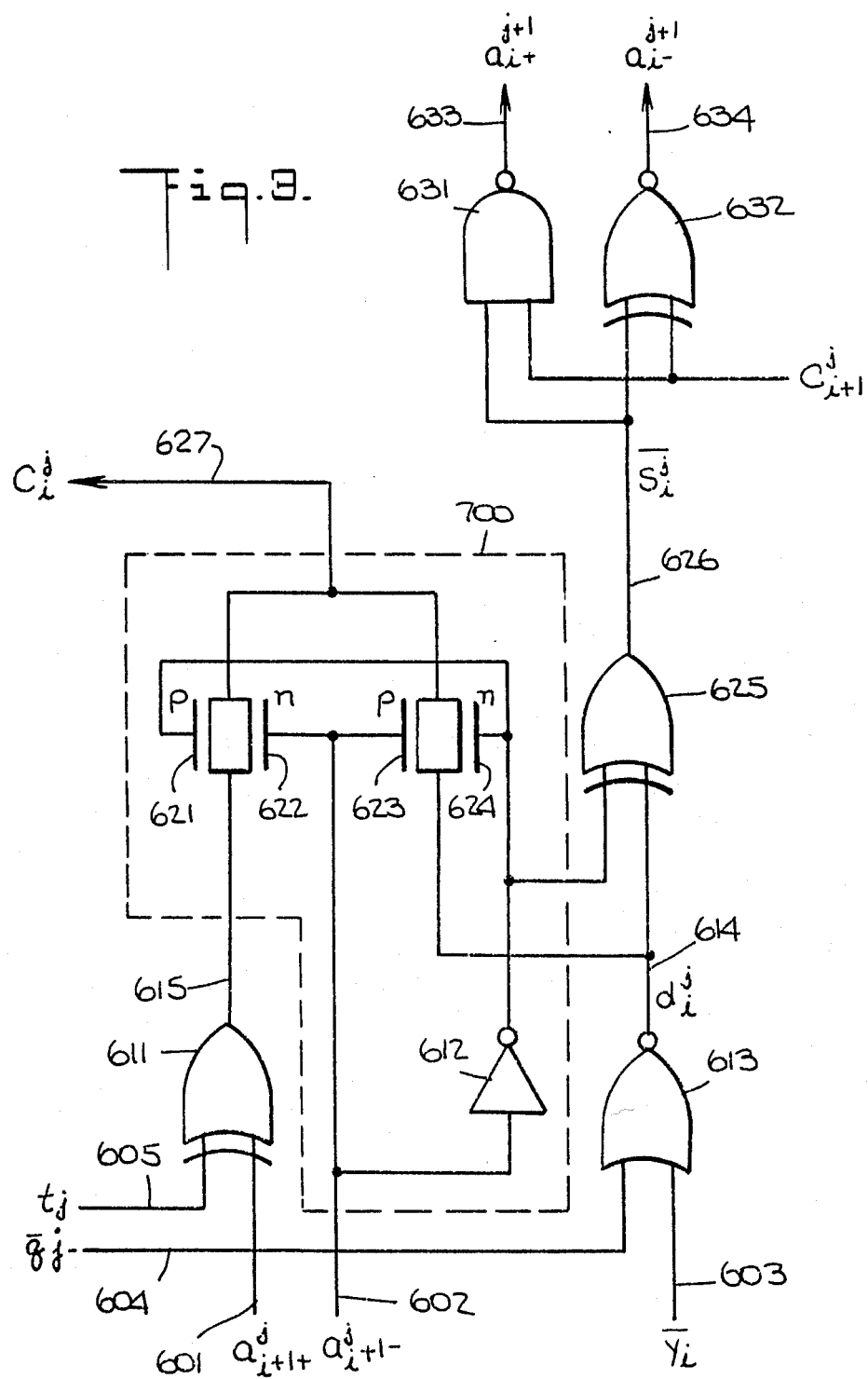
FIG. 3 is a circuit diagram showing a CMOS circuit which defines the basic cell shown in FIG. 2.

FIG. 3 is a circuit diagram of an embodiment of a basic addition cell 312, 313, . . . 329 of FIG. 2 implemented by CMOS circuitry by virtue of the binary coding described above. Gates 611 and 625 are EX-OR gates. Gate 612 is an inverter, gate 613 is two-input NOR gate, gate 631 is a two-input NAND gate, and gate 632 is an EX-NOR gate. A p-channel transistor 621/n-channel transistor 622 pair and p-channel transistor 623/n-channel transistor 624 pair constitute transfer gates, respectively.

Further, $a_{i+1+}{}^j$ on input 601 and $a_{i-1+}{}^j$ on input 602 constitute in combination the 2-bit input signal 340, 341, . . . 359 to the i+1th redundant addition cell shown in FIG. 2, and logical negation $\overline{y_i}$ on input 603 of the i-th decimal digit digit $y_i$ is the 1-bit input signal 361, 362 . . . 380 to that cell, as shown in FIG. 2. Signals $\overline{q_{j-}}$ on input 604 and $t_j$ on input 605 constitute in combination the 2-bit control signal 390 shown in FIG. 2. Signal on output 614 of gate 613 corresponds to the addend $d_i{}^j$. The signals on line 615 (input of gate 611) and on line 602 (output of transistor pairs) represent data corresponding to the augend $T^{(j)}(a_{i+1}{}^j)$. Signal $S_i{}^j$ on output 626 is a 1-bit signal which represents an intermediate sum. Signals $C_i{}^j$ on output 627 of the transistor pair indicates whether there is an intermediate carry, and signal $C_{i+1}{}^j$ on inputs 628 to gates 631 and 632 indicates whether or not there is an intermediate carry from the next lower order digit. Signals $a_{1+}{}^{j+1}$ on output 633 of gate 631 and $a_{1-}{}^{j+1}$ on output 634 of gate 632 constitute in combination 2-bit signals 410, 411, 412 . . . 430 representing the i-th decimal digit of the partial remainder.

In this case, the added determining means (second means) for outputting the divisor $y_i$ in place of 0 in response to the 1-bit signal $g_{j-}$ representing the magnitude of the j-th decimal digit $g_j$ of the quotient is implemented by NOR gate 613. The means for inverting the sign of the augend is implemented by exclusive OR gate 611. The intermediate sum determining circuit is constructed of exclusive OR gate 625 and the inverter 612, and the intermediate carry determining circuit (first circuit) is construced of switch circuitry composed of the transfer gates 621 and 622, transfer gates 623 and 624, and inverter 612. The circuit which receives the 1-bit signal $S_i{}^j$ representing the intermediate sum and the 1-bit signal $C_{i+1}{}^j$ representing the intermediate carry from the lower-order digits and which outputs the final sum 2-bit signal $a_{i+}{}^{j+1}$ and $a_{i-}{}^{j+1}$ is constructed of the NAND gate 631 and the exclusive NOR gate 632.

It is well known in the art that an exclusive OR circuit can be easily combined with a variety of inverters and replaced by an exclusive NOR circuit, and that a NAND circuit can also be easily combined with an inverter so that it can be replaced by a NOR circuit, or vice versa.

It should be noted that, although transfer gates are employed in this embodiment, it is possible to utilize ordinary gates.

Figure 4:
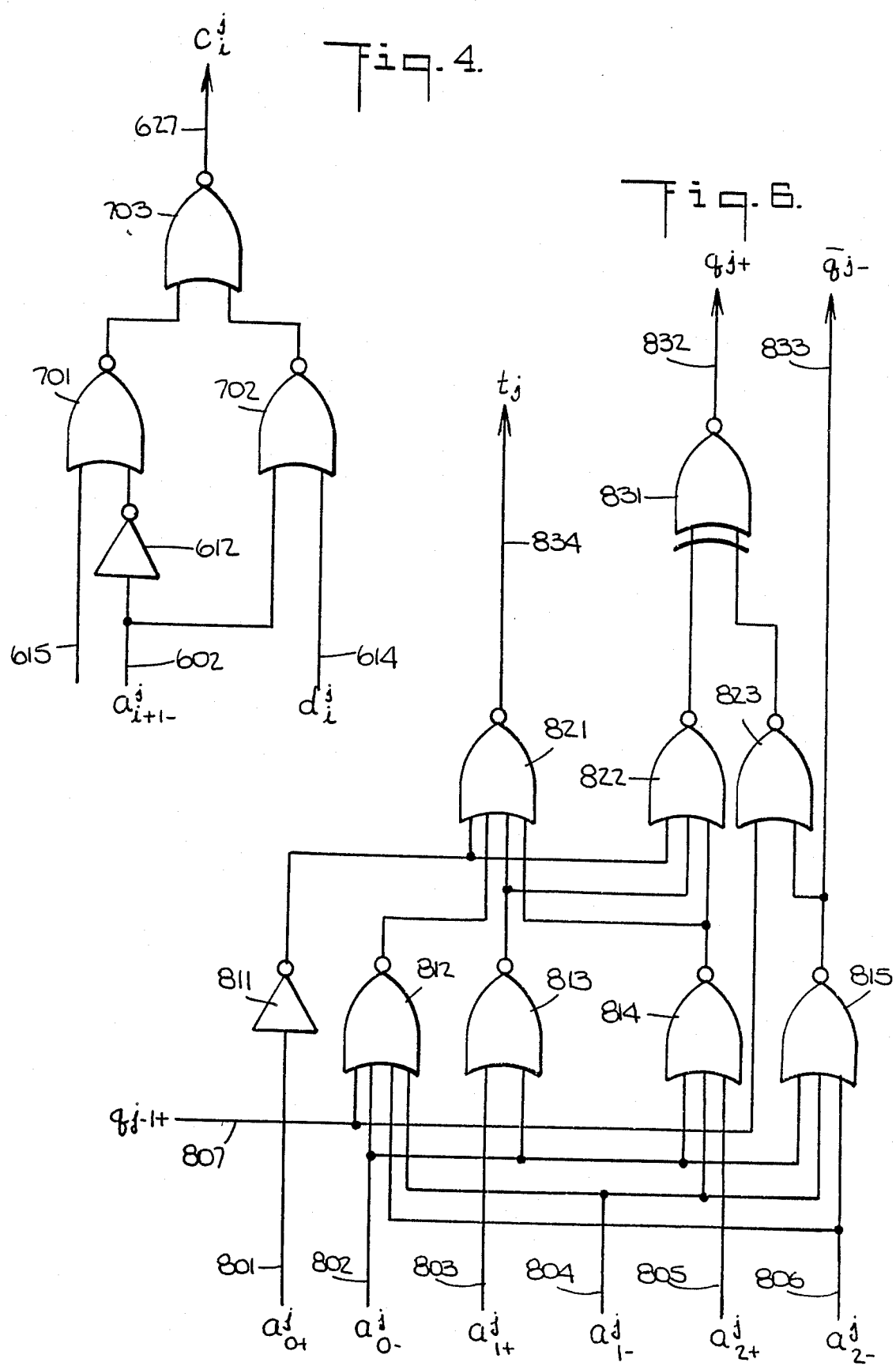
FIG. 4 is a circuit diagram of an embodiment of the transfer gate shown within broken lines in FIG. 3.

FIG. 4 shows an embodiment of the transfer gate portion 700 of the circuit shown in FIG. 3 in which portion 700 is constituted by NOR gates. Gates 701, 702 and 703 are 2-input NOR gates, while gates 701, 702 and 703 with inverter 612 constitute an intermediate carry determining circuit. However, since the arrangement shown in FIG. 4 leads to an increase in the number of stages and elements of the circuit, composite gates may be employed to implement circuit portion 700 of FIG. 3.

Like the partial remainder determining circuits 101, 102, . . . , initial partial remainder determining circuit 100 can also be constructed basically as an array of redundant addition cells as depicted in FIG. 2 for $t_j = 0$ and $\overline{g_{j-}} = 0$. The initial partial remainder determining circuit 100 may have its individual cells simplified by always setting the intermediate carry of each digit at 0, because of ordinary redundant subtraction of binary numbers or redundant addition of non-positive redundant binary numbers.

Figure 5:
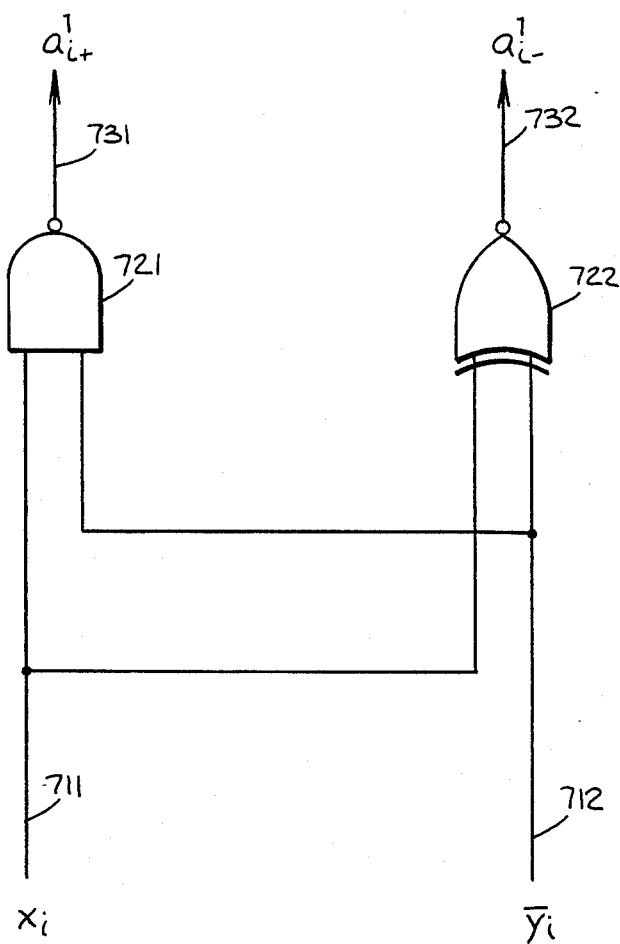
FIG. 5 is a circuit diagram of an embodiment of the initial partial remainder determining circuit of FIG. 1.

FIG. 5 depicts an embodiment of a redundant subtraction circuit (or cell) for binary numbers (i.e., $x_i$ and $y_i$) which may be used in the construction of the initial partial remainder determining circuit 100. Signal 711 is a 1-bit signal $x_i$ representing the i-th decimal digit of the dividend; signal 712 is a 1-bit signal $\overline{y_i}$ representing the logical negation of the i-th decimal digit of the divisor; and signals 731 and 732 are 2-bit signals $a_{i+}{}^1$ and $a_{i-}{}^1$ representing the i-th decimal digit of the initial partial remainder $A^{(1)}$. In this embodiment, the redundant subtraction circuit (or cell) is constructed of 2-input NAND circuit 721 and exclusive NOR circuit 722.

A description of a CMOS circuit embodiment of quotient determining cells 201, 202, 203, 204, ..., realized by virtue of the above-described binary coding system, will now be made with reference to FIG. 6. In FIG. 6, gate 811 is an inverter, gates 813 and 823 are two-input NOR gates, gates 814, 815 and 822 are three-input NOR gates, gates 812 and 821 are four-input NOR gates, and gate 831 is an EX-NOR gate.

Signal $a_{0+}{}^j$ on input 801 and signal $a_{0-}{}^j$ on input 802 constitute in combination the 2-bit input signal 410 shown in FIG. 2; signal $a_{1+}{}^j$ on output 803 and signal $a_{1-}{}^j$ on output 804 constitute the 2-bit input signal 411; and signal $a_{2+}{}^j$ on input 805 and signal $a_{2-}{}^j$ on input 806 constitute the 2-bit input signal 412. Signal $q_{j-1+}$ on output 807 corresponds to input signals 271, 272, 273 . . ., from higher-order quotient determining cells shown in FIG. 1. Signal $q_{j+}$ on output 832 and signal $\overline{q_{j-}}$ on output 833 constitute in combination a 2-bit signal representing the j-th decimal digit of the quotient; and signal $\overline{q_{j-}}$ on output 833 and signal $t_j$ on output 834 constitute the 2-bit signal for controlling the redundant addition cells 310, 311, 312, . . . 350 in the j-th stage.

Quotient determining means may comprise inverter 811 and NOR gates 813, 814, 822 and 815 in FIG. 6, and sign inversion means may comprise NOR gate 823 and EX-NOR gate 831 in FIG. 6. The 1-bit signal $t_j$ of the 2-bit control signal 390 is provided by inverter 811 and NOR gates 812, 813, 814 and 821. The 1-bit signal $q_{j-}$ 833 representing the magnitude of the quotient is used as it is for the remaining 1-bit control signal.

Although in the above-described embodiment of a CMOS circuit, the same sign is assigned to the partial remainder $a_i{}^j$ and the quotient $q_j$ in the binary coding, these values may be binary-coded so as to have different signs. Although addition of a redundant binary number and an ordinary binary number alone has been described above, a similar embodiment can be formed with respect to subtraction.

It should be noted that, when the basic cell shown in FIG. 3 employs 6-transistor EX-OR and EX-NOR gates, the number of transistors is 32, and the number of gates on the critical path is 3. In the quotient determing cell shown in FIG. 6, the number of transistors is 50, and the number of gates on the critical path is 2.

According to the present invention, a divider can be realized by combinational CMOS circuitry having an array structure formed from regularly arranged basic cells and quotient determining cells. Each basic cell involves a delay in arithmetic operations required per digit of a quotient equivalent to 5 gates and includes about 30 transistors, and each quotient determining cell includes about 50 transistors.

Accordingly, the divider according to the present invention has a reduced number of transistors which is substantially half of that in the conventional shift, subtract restore, divide units using prior art ripple-carry addition units, and the computing time (the number of transfer gates) is reduced to about 1/12 and about 1/24 of those of the prior art in the case of division operations with 32 bits and 64 bits, respectively. Further, the number of transistors required in the divider according to the present invention is substantially half of that of the conventional shift, subtract, restore divide units using prior art redundant binary addition and subtraction units.

Thus, the present invention is effective in reducing the number of circuit elements required to form a divider, enabling a divider to be realized compactly on an LSI chip and increasing operational speed.

According to the present invention, addition and subtraction in an arithmetic operation such as division or multiplication can be implemented by combinational circuitry using either a redundant addition circuit employing, for example, numbers in the signed digit (SD) expression in which each digit is allowed to have a negative value, or a redundant subtraction circuit, and it is possible to minimize carry or borrow propagation in addition or subtraction to one digit at most, thus providing the following advantages:

(1) the number of elements required to implement the arithmetic processor can be reduced to half as compared to the prior art;

(2) since addition and subtraction can be performed at high speed within a predetermined period of time irrespective of the number of digits, it is possible to increase the operational speed of the arithmetic processor;

(3) circuit structure can be simplified; and (4) the arithmetic processor can readily and economically be realized compactly on an LSI chip.

What is claimed is:

1. An arithmetic processor which performs carry-propagation-free addition operations utilizing binary signed-digit arithmetic on a binary signed-digit number and a conventional binary number, each having N digits denoted by an order index i which assumes integer values ranging from 1 to N, said arithmetic processor including a plurality of redundant addition cells connected in an array, each of which performs operations on single digits of a particular order i, said redundant addition cells each comprising:

(a) an intermedite carry generating means having as inputs a 1-bit signal $A_i$ representing the sign of the i-th digit of said signed-digit binary number, a one bit signal $B_i$ representing the magnitude of the i-th digit of said signed digit binary number and a 1-bit signal $y_i$ representing the i-th digit of said conventional binary number, said intermediate carry generating means determining therefrom an intermediate carry bit $C_i$ generated by a signed-digit addition operation, and providing said intermediate carry bit $C_i$ to said redundant addition cell which processes the (i+1)-th digit;

(b) an intermediate sum generating means having as inputs said 1-bit signal $B_i$ and said 1-bit signal $y_i$, and determining therefrom a 1-bit signal $S_i$ representing the intermediate sum digit for the i-th order; and (c) a final sum determining means having as input said 1-bit signal $S_i$ determined by said intermediate sum generating means and a 1-bit signal $C_{i-1}$ corresponding to the intermediate carry digit obtained from a redundant addition cell which processes the (i−1)-th digit, said final sum determining means determining therefrom a 2-bit signal representing the i-th digit of a signed-digit binary number which corresponds to the addition of the i-th order digits of said signed-digit binary number and said conventional binary number.

2. An arithmetic processor in accordance with claim 1, wherein said intermediate sum digit generating means is formed from a circuit which includes an Exclusive OR logic circuit to which said signal $B_i$ and said signal $y_i$ are supplied as inputs.

3. An arithmetic processor in accordance with claim 1, wherein said final sum determining means is formed from a circuit which includes an Exclusive NOR logic circuit to which said 1-bit signal $S_i$ and said 1-bit signal $C_{i-1}$ are supplied as inputs, said circuit providing a 1-bit signal $B_i$ representing the magnitude of the i-th digit of said binary signed-digit number which represents the final sum.

4. An arithmetic processor in accordance with claim 1, wherein said intermediate carry generating means is formed from a circuit including a switch circuit to which said signal $A_i$, said signal $B_i$, and said signal $y_i$ are provided as inputs, said switch circuit providing as output a 1-bit signal which is either $A_i$, $B_i$ or $y_i$.

5. An arithmetic processor which performs carry-propagation-free arithmetic on a binary signed-digit number and a conventional binary number, each having N digits denoted by an order index i which assumes integer values ranging from 1 to N, said arithmetic processor including a plurality of redundant arithmetic cells arranged in an array, each of which performs operations on single digits of a particular order i, said redundant arithmetic cells each comprising:

(a) a sign inversion determining means having as inputs a 1-bit signal $A_i$ representing the sign of the i-th digit of said signed-digit binary number and a 1-bit control signal t which determines whether said binary signed-digit binary number is to be added or subtracted from said conventional binary number, and providing as an output a 1-bit signal $IA_i$ which represents either the sign of the i-th digit of a number obtained by inverting the sign of said signed-digit binary number or a value corresponding to said 1-bit signal $A_i$ depending upon the value of said control signal t.

(b) an intermediate carry generating means to which are input said 1-bit signal $IA_i$ from said sign inversion determining means, a 1-bit signal $B_i$ representing the magnitude of the i-th digit of said signed-digit number and a 1-bit signal $y_i$ representing the i-th of said conventional binary number, and which determines therefrom a 1-bit signal $C_i$ representing a carry bit which is output to one of said redundant arithmetic cells which performs operation on the (i+1)th order digits;

(c) an intermediate sum generating means to which are input said 1-bit signal $B_i$ and said 1-bit signal $y_i$, and which determines therefrom a 1-bit signal $S_i$ representing an intermediate sum digit for said arithmetic operation; and (d) a final sum determining means to which are input said 1-bit signal $S_i$ corresponding to the i-th digit of the intermediate sum and a 1-bit carry signal $C_{i-1}$ corresponding to the (i−1)th carry bit from an arithmetic operation of the next lower order, and which determines therefrom a 2-bit signal corresponding to the sign and magnitude of the i-th digit of the final sum expressed as a signed-digit number.

6. An arithmetic processor in accordance with claim 5, wherein said sign inversion determining means includes at least one Exclusive OR logic circuit to which is input said 1-bit signal $A_i$ representing the sign of said i-th digit of said signed-digit binary number and said 1-bit control signal t.

7. An arithmetic processor in accordance with claim 6, wherein said intermediate sum digit generating means is formed from a circuit which includes an Exclusive OR logic circuit to which said signal $B_i$ and said signal $y_i$ are supplied as inputs.

8. An arithmetic processor in accordance with claim 6, wherein said final sum determining means is formed from a circuit which includes an Exclusive NOR logic circuit to which said 1-bit signal $S_i$ and said 1-bit signal $C_{i-1}$ are supplied as inputs, said circuit providing a 1-bit signal $B_i$ representing the magnitude of the i-th digit of said binary signed-digit number which represents the final sum.

9. An arithmetic processor in accordance with claim 6, wherein said intermediate carry generating means is formed from a circuit including a switch circuit to which said signal $A_i$, said signal $B_i$, and said signal $y_i$ are provided as inputs, said switch circuit providing as output a 1-bit signal which is either $A_i$, $B_i$ or $y_i$.

10. An arithmetic processor in accordance with claim 5, wherein said intermediate sum digit generating means is formed from a circuit which includes an Exclusive OR logic circuit to which said signal $B_i$ and said signal $y_i$ are supplied as inputs.

11. An arithmetic processor in accordance with claim 5, wherein said final sum determining means is formed from a circuit which includes an Exclusive NOR logic circuit to which said 1-bit signal $S_i$ and said 1-bit signal $C_{i-1}$ are supplied as inputs, said circuit providing a 1-bit signal $B_i$ representing the magnitude of the i-th digit of said binary signed-digit number which represents the final sum.

12. An arithmetic processor in accordance with claim 5, wherein said intermediate carry generating means is formed from a circuit including a switch circuit to which said signal $A_i$, said signal $B_i$, and said signal $y_i$ are provided as inputs, said switch circuit providing as output a 1-bit signal which is either $A_i$, $B_i$ or $y_i$.

13. An arithmetic processor which performs carry-propagation-free arithmetic utilizing signed-digit operations on a binary signed-digit number and a conventional binary number, each having N digits denoted by an order index i which assumes integer values ranging from 1 to N, said arithmetic processor including a plurality of redundant arithmetic cells arranged in an array, each of which performs arithmetic operations on single digits of a particular order i, said redundant arithmetic cells each comprising:

(a) an operator determining means to which is input a 1-input signal $y_i$ representing the i-th digit of said conventional binary number and a 1-bit control signal Q and which outputs a 1-bit signal $MY_i$ which corresponds to either said 1-bit signal $y_i$ or to a 1-bit signal representing zero, depending upon said value of Q;

(b) an intermediate carry generating means to which is input a 1-bit signal $A_i$ representing the sign of the i-th digit of said signed digit binary number, a 1-bit signal $B_i$ representing the magnitude of said i-th digit of said binary signed-digit number, a control signal t, and said signal $MY_i$ from said operator determining means, wherein said binary signed-digit number is either added to or substracted from said conventional binary number depending upon the value of said control signal t and a 1-bit signal $C_i$ is determined therefrom which is output as a carry bit to said redundant arithmetic cell which performs operations on the (i+1)th order digits;

(c) an intermediate sum generating means to which are input said 1-bit signal $B_i$ representing the magnitude of the i-th digit of said binary signed-digit number and said signal $MY_i$, and which determines therefrom a 1-bit signal $S_i$ representing an intermediate sum digit of said i-th order arithmetic operation; and (d) a final sum determining means to which are input said 1-bit signal $S_i$ and a 1-bit signal $C_{i-1}$ which corresponds to the carry bit determined by the arithmetic cell which processes the (i-1)th order digits, said final sum determining means determining therefrom a 2-bit signal representing the result of said arithmetic operation for said i-th order.

14. The arithmetic processor in accordance with claim 13, wherein said operator determining means is formed from a circuit which includes either an AND logic circuit or a NOR logic circuit to which said signal $y_i$ and said control signal Q are supplied as inputs.

15. A divider comprising a plurality of partial remainder determining means each of which includes a plurality of N+1 arithmetic cells arranged in an array, wherein each of said arithmetic cells which constitutes the j-th partial remainder determining means, where index j assumes the integer values from 1 to N, performs arithmetic operations on digits corresponding to the i-th position from the decimal point, where index i assumes integer values from 0 to N, a plurality of quotient determining means which receive the outputs of said partial remainder determining means and provide a binary signed-digit number representing a quotient, and a conversion means for converting said quotient into an ordinary binary number, each of said arithmetic cells which constitute said partial remainder determining means for index j including:

(a) an operator determining means to which is input a 1-bit signal $y_i$ representing the i-th digit from the decimal point of a divisor expressed as conventional binary number and a 1-bit control signal Q and which outputs a 1-bit signal $MY_i$ which corresponds to either said 1-bit signal $y_i$ or a 1-bit signal representing zero, depending upon said value of Q;

(b) a sign inversion determining means having as inputs a 1-bit signal $A_i$ representing the sign of the i-th digit of a binary signed digit number which is a partial remainder determined by said (j-1)th partial remainder determining means and a 1-bit control signal t which determines whether said binary signed-digit binary number is to be added or subtracted from said conventional binary number, and providing as an output a 1-bit signal $IA_i$ which represents either the sign of the i-th digit of a number obtained by inverting the sign of said binary signed-digit number or a value corresponding to said 1-bit signal $A_i$, depending upon the value of said control signal t;

(c) an intermediate carry generating means to which are input said 1-bit signal $IA_i$ from said sign inversion means, a 1-bit signal $B_i$ representing the magnitude of the i-th digit of said binary signed-digit number and said 1-bit signal $MY_i$ from said operator determining means, and which determines therefrom and outputs a 1-bit signal $C_i$ as a carry bit to said arithmetic cell which performs operations on digits of the (i-1)th position;

(d) an intermediate sum generating means to which are input said 1-bit signal $B_i$ and said signal $MY_i$, and which determines therefrom a 1-bit signal $S_i$ representing an intermediate sum digit corresponding to the i-th position from the decimal point; and (e) a final sum determining means to which are input said 1-bit signal $S_i$ and a 1-bit signal $C_{i+1}$ which corresponds to a carry bit determined by the arithmetic cell which processes the (i+1)th order arithmetic operation, and which determines therefrom a 2-bit signal representing the final sum for said i-th digit of the j-th partial remainder.

16. A divider in accordance with claim 15 wherein said j-th quotient determining means receives a signal representing the most significant three digits of a binary signed-digit number corresponding to the j-th partial remainder determined by said partial remainder determining means and a 1-bit signal provided by the (j-i)th quotient determining means and determines therefrom a 2-bit signal representing the j-th digit from the decimal point of said quotient which is input to said conversion means, and also determines therefrom said 1-bit control signal t, and said 1-bit control signal Q which are both input to each of said arithmetic cells which form the (j+1)th partial remainder determining means.

17. A divider in accordance with claim 15 wherein j-th quotient determining means receives a 6-bit signal representing the most significant three digits of a binary signed-digit number corresponding to the j-th partial remainder determined by said partial remainder determining means and a 1-bit signal provided by the (j-i)th quotient determining means and determines therefrom a 2-bit signal representing the j-th digit from the decimal point of said quotient which is input to said conversion means, and said 1-bit control signal t which is input to each of said arithmetic cells which form the (j+1)th partial remainder determining means; wherein part of said 2-bit signal determined therein forms said 1-bit control signal Q which is provided as input to each of said arithmetic cells which form the (j+1)th determining means; and wherein the other 1-bit of said 2-bit signal is provided as input to the (j+1)th quotient determining means.

18. A divider in accordance with claim 15, wherein said sign inversion determining means comprises an Exclusive OR logic circuit to which said 1-bit signal $A_i$ and said 1-bit control signal t are supplied as inputs.

19. A divider in accordance with claim 15, wherein said operator determining means comprises a NOR logic circuit or an AND logic circuit to which said 1-bit signal $y_i$ and said 1-bit control signal Q are supplied as inputs.

20. A divider in accordance with claim 15, wherein said intermediate sum digit generating means comprises an Exclusive OR logic circuit to which said 1-bit signal $B_i$ and said 1-bit signal $MY_i$ are supplied as inputs.

21. A divider in accordance with claim 15, wherein said final sum determining means comprises an exclusive NOR logic circuit to which said 1-bit signal $S_i$ and said 1-bit signal $C_{i+1}$ which represents the carry bit obtained from an arithmetic unit which processes operations of the (i+1)th decimal digit are supplied as inputs, said circuit outputting a 1-bit signal representing the magnitude of a binary signed-digit number which represents the final sum at the i-th position from the decimal point.

22. A divider in accordance with claim 15, wherein said intermediate carry generating means comprises a switch circuit to which said 1-bit signal $IA_i$, said 1-bit signal $B_i$, and said 1-bit signal $MY_i$ are supplied as inputs, said switch circuit providing as outputs either said 1-bit signal $IA_i$, said 1-bit signal $MY_i$ or said 1-bit signal $B_i$.

23. A divider which performs division operations by utilizing signed-digit arithmetic comprising:
- (a) a plurality of arithmetic cells each of which performs signed-digit arithmetic on single digits corresponding to different positions from the decimal point denoted by an index i which assumes integer values ranging from 0 to N;
- (b) a plurality of partial remainder determining means denoted by an index j which assumes integer values from 1 to N, each of which includes said plurality of arithmetic cells arranged in an array;
- (c) a plurality of quotient determining means denoted by said index j, each of which receive the output of said partial remainder determining means of corresponding index, determining therefrom a digit of a quotient expressed as a binary signed-digit number, wherein said j-th quotient determining means which determines the j-th quotient digit receives a signal representing the most significant three digits of a binary signed-digit number corresponding to said j-th partial remainder, and outputs a 2-bit signal which represents the j-th digit of said quotient and a 2-bit control signal for controlling said plurality of arithmetic cells which constitute the (j+1)-th partial remainder means; and
- (d) a conversion means which receives each of said 2-bit signals which represent the digits of said quotient from said plurality of quotient determining means and converts said digits which form a quotient expressed as a binary signed-digit number into a quotient expressed as an ordinary binary number.

* * * * *

UNITED STATES PATENT AND TRADEMARK OFFICE
CERTIFICATE OF CORRECTION

PATENT NO. : 4,878,192

DATED : October 31, 1989

INVENTOR(S) : Tamotsu Nishiyama and Shigeo Kuninobu

It is certified that error appears in the above-identified patent and that said Letters Patent is hereby corrected as shown below:

Col. 5, line 59  "D" should be "$\overline{D}$"

Col. 6, line 5  "x" should be "$\overline{x}$"

line 56  "$a_{i+1}{}^j$" should be "$a^j_{i+1}$"

line 62  "$B \cdot \overline{C} + \overline{B} \cdot C$" should be "$B \cdot \overline{C} + \overline{B} \cdot C$"

line 64  "$a_{i+1}{}^j$" should be "$a^j_{i+1}$"

line 68  "$A \cdot B + C \cdot \overline{B}$" should be "$A \cdot B + C \cdot \overline{B}$"

Col. 7, line 1  "$a_{i+1}{}^j$" should be "$a^j_{i+1}$"

line 4  "$a_{i+1}{}^j$" should be "$a^j_{i+1}$"

UNITED STATES PATENT AND TRADEMARK OFFICE
CERTIFICATE OF CORRECTION

PATENT NO. : 4,878,192                                PAGE 2 of 5
DATED      : October 31, 1989
INVENTOR(S): Tamotsu Nishiyama and Shigeo Kuninobu It is certified that error appears in the above-identified patent and that said Letters Patent is hereby corrected as shown below:

line 8 "$a_{i-}^{(j+1)}$" should be "$a_i^{j+1}$"

line 11 "$K \cdot (B \cdot C + \overline{B} \cdot \overline{C}) + \overline{K} \cdot (\overline{B} \cdot C + B \cdot \overline{C})$" should be "$K \cdot (B \cdot C + \overline{B} \cdot \overline{C}) + \overline{K} \cdot (\overline{B} \cdot C + B \cdot \overline{C})$"

line 15 "$a_i^{(j+1)}$" should be "$a_i^{j+1}$"

line 17 "$\overline{B} \cdot C + B \cdot \overline{C}$" should be "$\overline{B} \cdot C + B \cdot \overline{C}$"

Col. 8, line 66 "$A^{(j)-}$" should be "$A^{(j)}$"

Col. 9, line 33 "$b_1^j$" should be "$b_i^j$"

line 33 "$-a_1^j$" should be "$-a_i^j$"

line 62 "$Z_1 Z_2$" should be "$z_1 z_2$"

Col. 10, line 17 "340, 341, 342, 340" should be "340"

line 33 "$a_0^{j+1}, a_1^{\ j+1}$" should be "$a_0^{j+1}, a_1^{j+1}$"

line 34 "$a_2^{j+1}, \ldots, a_n^{\ j+1}$" should be "$a_2^{j+1}, \ldots, a_n^{j+1}$"

line 68 "$a_{i+}^{\ j} a_{i-}^{\ j}$" should be "$a_{i+}^j a_{i-}^j$"

UNITED STATES PATENT AND TRADEMARK OFFICE
CERTIFICATE OF CORRECTION

PATENT NO. : 4,878,192

DATED : October 31, 1989

INVENTOR(S) : Tamotsu Nishiyama and Shigeo Kuninobu

It is certified that error appears in the above-identified patent and that said Letters Patent is hereby corrected as shown below:

Col. 11, line 14 "$a_{0+}^{j} \cdot (a_{0-}^{j} + a_{1+}^{j}) \cdot (a_{0-}^{j} + a_{1-}^{j} + a_{2+}^{j}) \cdot (a_{0-}^{j-}$" should be "$a_{0+}^{j} + (a_{0-}^{j} + a_{1+}^{j}) \cdot (a_{0-}^{j} + a_{1-}^{j} + a_{2+}^{j}) \cdot (a_{0-}^{j}$"

line 15 "$+ a_{1-}^{j} + a_{2-}^{j} + q_{j-1+})$" should be "$+ a_{1-}^{j} + a_{2-}^{j} + q_{j-1+})$"

line 20 "$a_{2-}^{j} -$" should be "$a_{2-}^{j}$"

line 24 "$(a_{0+}^{j} + (a_{0-}^{j} + a_{1+}^{j}) + (a_{0-}^{j} + a_{1-}^{j} + a_{2+}^{j} \ast) \oplus (g_{j-1+} + q_{j})$" should be "$(a_{0+}^{j} + \overline{(a_{0-}^{j} + a_{1+}^{j})} + \overline{(a_{0-}^{j} + a_{1-}^{j} + a_{2+}^{j})}) \oplus (q_{j-1+} + \overline{q_{j-}})$"

line 29 "$a_{i-}^{j} + a_{i+}^{j}$ and $q_{j-}$" should be "$\overline{a_{i-}^{j}} + \overline{a_{i+}^{j}}$ and $\overline{q_{j-}}$"

line 32 "$a_{i-}^{j} + a_{i+}^{j}$" should be "$a_{i-}^{j} + a_{i+}^{j}$"

line 43 "$d_{i}^{j} a_{i+1-}^{j}$" should be "$d_{i}^{j} \cdot \overline{a_{i+1-}^{j}}$"

line 43 "$t_{j}) a_{i+1}^{j}$" should be "$t_{j}) \cdot a_{i+1}^{j}$"

UNITED STATES PATENT AND TRADEMARK OFFICE
CERTIFICATE OF CORRECTION

PATENT NO. : 4,878,192

DATED : October 31, 1989

INVENTOR(S) : Tamotsu Nishiyama and Shigeo Kuninobu

It is certified that error appears in the above-identified patent and that said Letters Patent is hereby corrected as shown below:

Col. 11, line 47 "$c_{i+1}^{j}$" should be "$c_{i+1}^{-j}$"

line 61 "$a_{i+1+}{}^{j}$" should be "$a_{i+1+}^{j}$"

line 61 "$a_{i-1+}{}^{j}$" should be "$a_{i+1-}^{j}$"

Col. 12, line 4 "$a_{i+1}{}^{j}$" should be "$a_{i+1}^{j}$"

line 4 "$s_i^{\bar{j}}$" should be "$s_i^{-j}$"

line 8 "$c_{i+1}{}^{j}$" should be "$c_{i+1}^{j}$"

line 10 "$a_{1+}{}^{j+1}$" should be "$a_{i+}^{j+1}$"

line 11 "$a_{1-}{}^{j+1}$" should be "$a_{i-}^{j+1}$"

line 16 "$g_{j-}$" should be "$q_{j-}$"

line 17 "$g_j$" should be "$q_j$"

line 26 "$s_1^{\bar{j}}$" should be "$s_1^{-j}$"

line 27 "$c_{i+1}{}^{j}$" should be "$c_{i+1}^{j}$"

line 29 "$a_{i+}{}^{j+1}$" should be "$a_{i+}^{j+1}$"

UNITED STATES PATENT AND TRADEMARK OFFICE
CERTIFICATE OF CORRECTION

PATENT NO. : 4,878,192

DATED : October 31, 1989

INVENTOR(S) : Tamotsu Nishiyama and Shigeo Kuninobu

It is certified that error appears in the above-identified patent and that said Letters Patent is hereby corrected as shown below:

Col. 12, line 29 "$a_{i-}^{\,j-1}$" should be "$a_{i-}^{j-1}$"

line 55 "$\bar{g}_{j-}$" should be "$\bar{q}_{j-}$"

line 68 "$a_{i+}^{\,1}$" should be "$a_{i+}^{1}$" and "$a_{i-}^{\,1}$" should be "$a_{i-}^{1}$"

Col. 13, line 13 "$a_{o+}^{\,j}$" should be "$a_{o+}^{j}$"

line 13 "$a_{o-}^{\,j}$" should be "$a_{o-}^{j}$"

line 15 "$a_{1+}^{\,j}$" should be "$a_{1+}^{j}$"

line 16 "$a_{1-}^{\,j}$" should be "$a_{1-}^{j}$"

line 17 "$a_{2+}^{\,j}$" should be "$a_{2+}^{j}$"

line 17 "$a_{2-}^{\,j}$" should be "$a_{2-}^{j}$"

Signed and Sealed this

Eighteenth Day of October, 1994

Attest:

BRUCE LEHMAN

*Attesting Officer*   *Commissioner of Patents and Trademarks*